SEDIMENTATION VOLUME IN t-BUTANOL WATER SOLUTION

TEMP: 25°C
POWDER POLYETHYLENE
REFER TO TABLE 1

SOLUBILITY OF ETHYLENE IN t-BUTANOL-WATER SOLUTION

TEMP: 25°C
PRESSURE: 400 Kg/cm²

SEDIMENTATION VOLUME IN METHANOL-WATER SOLUTION

TEMP: 25°C
POWDER POLYETHYLENE:
REFER TO TABLE 1

SOLUBILITY OF ETHYLENE IN METHANOL-WATER SOLUTION

TEMP: 25°C
PRESSURE: 400 Kg/cm$^2$

SEDIMENTATION VOLUME IN ISO-PROPANOL WATER SOLUTION

TEMP: 25°C
POWDER POLYETHYLENE:
REFER TO TABLE 1

SOLUBILITY OF ETHYLENE IN ISO-PROPANOL WATER SOLUTION

TEMP: 25°C
PRESSURE: 400 Kg/cm$^2$

United States Patent Office 3,553,187
Patented Jan. 5, 1971

3,553,187
CONTINUOUS PROCESS FOR PRODUCING POWDER POLYETHYLENE
Masaaki Takehisa, Tadao Yamada, Yoshio Takasaka, and Kazukiyo Miyanaga, Takasaki-shi, Japan, assignors to Japan Atomic Energy Research Institute
Filed Dec. 4, 1967, Ser. No. 687,619
Claims priority, application Japan, Dec. 2, 1966, 41/78,613
Int. Cl. C08f *3/04, 47/02*
U.S. Cl. 260—94.9                                     6 Claims

ABSTRACT OF THE DISCLOSURE

This invention is based in the finding that an aqueous solution (having a surface tension of 32.5 dyne/cm. or less) of an alkanol having 1–4 carbon atoms is suitable as a carrier or dispersion medium for continuously separating powder polyethylene which is produced by polymerizing ethylene at a temperature lower than the melting point of the produced polyethylene from the reaction vessel in the form of a slurry in which the powder polyethylene is dispersed.

BACKGROUND OF THE INVENTION

It is already known that polyethylene is produced in the form of fine powder when ethylene is polymerized at a temperature lower than the melting point of the produced polyethylene by means of an ionizing radiation or a radical initiator, either in the gaseous phase without any reaction medium or in a reaction system which comprises ethylene and a liquid medium in which ethylene but not the polymerized product (polyethylene) dissolves. (Hereinafter, the term "powder polyethylene" means the polyethylene powder produced in the form of powder in the stage of polymerization.)

The thus produced powder polyethylene has desirable properties which are not found in the conventional polyethylene powder which is produced by secondary mechanical or physicochemical pulverization of polyethylene produced in lump or coarse powder form by the so-called high pressure process or the so-called low or intermediate pressure process, and many ways of utilization of said powder polyethylene are expected.

However, when ethylene is polymerized in the gaseous phase without any medium, it is necessary to employ a suitable carrier or dispersion medium in order to continuously discharge the polymerized product out of the reactor system. Without a suitable carrier or dispersion medium, production of said powder polyethylene by a continuous process is impossible or extremely difficult.

Water was once proposed as a carrier or dispersion medium for the above-mentioned purpose. But water is quite unsatisfactory as a medium for this purpose and practically cannot be used. The carrier or dispersion medium to be used for the purpose should satisfy the following conditions: (1) it must be a stable substance that does not substantially undergo decomposition by irradiation or by the action of radical initiators; (2) it must be easily separated from the polymerized product; (3) it must dissolve little or no monomeric ethylene; (4) it must be able to easily disperse the produced powder polyethylene and maintain it in a stable state of slurry; and (5) its cost must be moderate.

Prior studies indicated that water and alkanol satisfy condition (1). We have taken up this fact and searched for solvents which would satisfy conditions (2), (3), (4) and (5), and we have found that an aqueous solution of one of the alkanols having 1–4 carbons the alkanol concentration of which is adjusted so that the surface tension of said solution may be 32.5 dyne/cm. or less serves satisfactorily as the carrier or dispersion medium for continuously discharging the polyethylene produced in the form of fine powder by means of a radiation out of the reactor system. Said alkanols include methanol, ethanol, n-propanol, iso-propanol, n-butanol, iso-butanol, sec-butanol and t-butanol.

As to condition (2), it is desirable to select as a component of said medium an alkanol the boiling point of which is as low as possible in view of the fact that drying, extraction and distillation and so forth are required when the medium is separated and recovered from the slurry comprising said medium and the porous powder polyethylene. The above-mentioned alkanols have low boiling points and satisfy condition (2). Alkanols having five or more carbons are not suitable because of their higher boiling point.

The chief function of the carrier or dispersion medium for discharging the polymerized product is to separate the produced powder polyethylene from the unreacted ethylene. That is, said carrier and said powder must form a slurry in which the unreacted ethylene dissolves little or not at all. It is known that organic solvents such as alkanols disperse polyethylene powder, but at the same time, they dissolve ethylene remarkably. Since polymerization of ethylene is carried out under high pressure and solubility of ethylene in an alkanol is enhanced under high pressure, an alkanol itself cannot be used as the carrier. In this respect, keeping in mind that, though water has very poor dispersing power for powder polyethylene, ethylene hardly dissolves in it, we have investigated the possibility of using aqueous solution of the above-mentioned alkanols as the carrier and have found that a water-alkanol solution the surface tension of which is more than 32.5 dyne/cm. will disperse little or no polyethylene produced in the form of powder by radiation polymerization of ethylene, while a water-alkanol solution the surface tension of which is 32.5 dyne/cm. or less easily disperses said polyethylene. That is to say, our experiments indicate that 32.5 dyne/cm. is a critical surface tension with respect to the dispersibility of the polyethylene powder. As seen in Table 2 aqueous solutions of the alkanols the alkanol concentration of which is critical with respect to the dispersibility of the powder polyethylene at 25° C. shows a surface tension of 32.5 dyne/cm. in all the cases.

Also, it is considered that as the concentration of alkanol in the aqueous solution increases (that is, as the surface tension of the solution decreases), solubility of ethylene increases; therefore, alkanol concentration in an aqueous solution should preferably be as low as possible. This is in line with economy in production. In conclusion, it has been revealed that an aqueous solution of an alkanol having 1–4 carbon atoms of a concentration at which the surface tension is 32.5 dyne/cm. or less fully satisfies all the conditions (1) to (5) required for a carrier to be used in the continuous production of powder polyethylene by radiation polymerization of ethylene.

Also we have devised an apparatus in which the powder polyethylene is continuously produced and continuously taken out of the reaction vessel by using the above-mentioned carrier or dispersion medium.

SUMMARY OF THE INVENTION

This invention relates to a process for producing powder polyethylene by polymerizing ethylene at a temperature lower than the melting point of the produced polyethylene in the pressurized gaseous phase by means of an ionizing radiation or a radical initiator in which pressurized gaseous monomeric ethylene is circulated through a reactor system (a reaction zone and a product-separating zone) a carrier or dispersion medium comprising an aqueous solution of an alkanol having 1–4 carbon atoms, the alkanol concentration of which is adjusted so that the surface tension of said solution is 32.5 dyne/cm. or less is circulated between said product-separating zone and a product recovery zone, said medium contacting the circulating ethylene in said separating zone so that the produced powder polyethylene may be collected in said medium as a thin slurry, said slurry being carried through a pressure reducing means, to said product recovery zone which is kept at atmospheric pressure, the powder polyethylene dispersed in said slurry being allowed to settle in said product recovery zone and being discharged therefrom as a thick slurry to be dried and recovered, and fresh ethylene is continuously supplied to said ethylene circulating in said reactor system to compensate for the amount of ethylene consumed.

That is to say, pressurized ethylene is circulated in a reactor system, which comprises a reaction zone (a reactor placed in an irradiated zone or a reactor equipped with a radical initiator-feeder); a product-separating zone (a separating tank) in which the reaction mixture (gaseous monomeric ethylene and produced powder polyethylene) is contacted with said water-alkanol carrier or dispersion medium; and means to circulate ethylene in the reactor system which functions to maintain the internal pressure of the reactor system at a predetermined level and to circulate ethylene through the reaction zone and the product-separating zone; and to replenish the reactor system with fresh ethylene to compensate for the amount of the ethylene consumed. Said medium is circulated between said product-separating zone and product recovery zone (a settling tank) by a circulation means.

As ethylene passes through the reaction zone, powder polyethylene is produced and it is carried to the product-separating zone together with the circulating unreacted gaseous ethylene, and the powder polyethylene is transferred to the medium in said separating zone, in which said powder polyethylene is dispersed in said medium as a thin slurry. The thin slurry is then moved through a pressure reducing means to the product recovery zone, the internal pressure of which is kept at atmospheric pressure.

The ethylene that has given off the entrained powder polyethylene to the medium in the product-separating zone is recirculated to the reaction zone by said circulation means, and fresh ethylene in an amount equivalent to that of the consumed ethylene is supplied to the reactor system.

In the product recovery zone (settling tank), the dispersed powder polyethylene settles to form a thick slurry, which is taken out to be dried and recovered. (The polyethylene powder in the slurry sinks or floats according to the density of the polyethylene powder and the medium.) The remaining liquid, that is, the medium is separately taken out, filtered and is stored in a reservoir, from which it is recirculated to the product-separating zone by a pump means. In this way, powder polyethylene is continuously produced and discharged.

The reaction zone or reactor may be a pressure-resistant reaction vessel or a pipe reactor or anything like that, which is simply placed in an irradiated zone or else is equipped with a radical initiator-feeding means such as an automatic injection syringe.

Ionizing radiations applicable in the method of this invention include electromagnetic waves such as gamma rays, or X-rays and corpuscular radiations such as beta rays, alpha rays or beams of fission fragments. It is now well known that all these radiations have the same effect on the polymerization of ethylene. (Cf. Chapiro: Radiation Chemistry in Polymeric System, Interscience, 1962 pp. 1–36.) Selection of species and dose rate of the ionizing radiation to be applied can easily be determined by any person skilled in the art.

Radical initiators applicable to the method of this invention include benzoyl peroxide, azo-bis-isobutylonitrile, di-t-butyl peroxide, di-isopropyl-peroxy-dicarbonate etc. which easily decompose at temperatures lower than the melting point of polyethylene.

However, it should be understood that the process of this invention is applicable to any process for producing powder polyethylene in the gaseous phase at a temperature lower than the melting point of the produced polyethylene in general no matter how the polymerization reaction is promoted.

The reaction apparatus per se used for the process of this invention can be easily made up by any person skilled in the art. A pressure reducing means used in the conduit connecting the high pressure product-separating zone (separating tank) and the product recovery zone (settling tank) kept at atmospheric pressure may be a simple valve intermittently opened or a long pipe of small diameter coiled in spiral, or any other equivalent apparatus.

DETAILED DESCRIPTION OF THE INVENTION

Now the invention is described in detail by way of experiments and examples. Basic experiments were carried out using a powder polyethylene produced under the conditions summarised in Table 1.

TABLE 1

Condition of polymerization:
Temperature (° C.) _____ 30
Pressure (kg./cm.$^2$) _____ 400
Mean residence time in the irradiated zone (hr.) _____ 0.16
Radiation source, Cobalt 60 _____ kCi__ 108
Dose rate _____ rad./hr__ $3.7 \times 10^5$
Properties of produced polyethylene:
Number average molecular weight _____ $7.1 \times 10^4$
Density (g./cm.$^3$) _____ 0.939
High load melt index _____ 1.3
Melting point (° C.) _____ 123
Number of methyl branching (number of branching per $10^3$ carbon atoms) _____ 0.8
Average particle size _____ microns__ 200

Experiment 1

Dispersibility of the powder polyethylene exemplified in Table 1 was checked by mixing 0.1 g. of said powder polyethylene in 10 cc. of aqueous solution of methanol of various concentrations at 25° C. Solubility of ethylene in said solutions was also studied.

Figure 1:
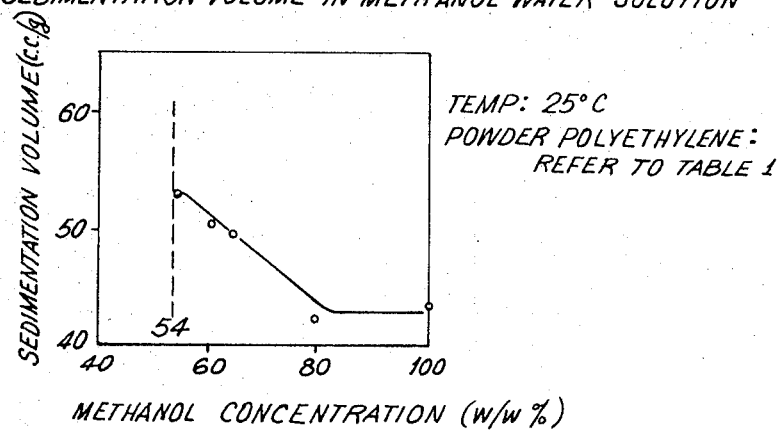
FIG. 1 shows the relation between methanol concentration and sedimentation volume (volume of settled slurry) of powder polyethylene in the methanol-water composition in accordance with this invention.
Figure 2:
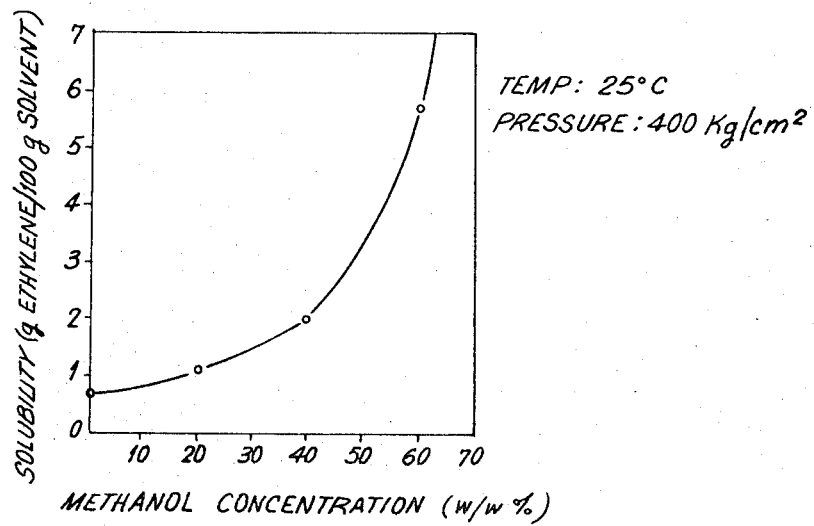
FIG. 2 shows the relation between solubility of ethylene and methanol concentration in the composition of FIG. 1.
Figure 5:
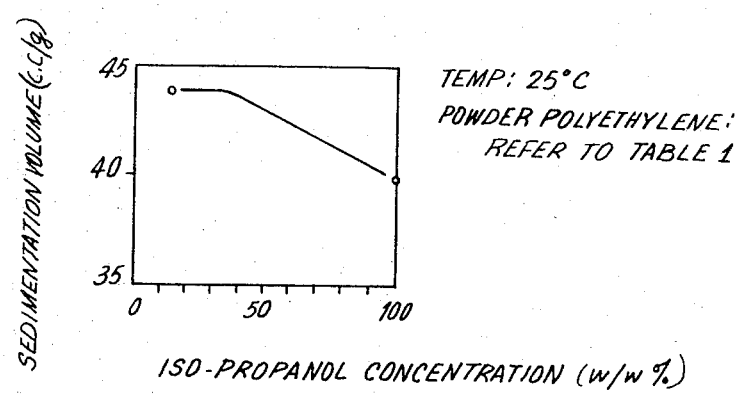
FIG. 5 shows the same relation of FIG. 1 with respect to iso-propanol-water composition.

The polyethylene was well dispersed in a solution the methanol concentration of which is 54% by weight or more, while, in contrast, the dispersibility was very poor in a solution with methanol concentration less than 54% by weight. Surface tension of the 54% aqueous solution of methanol was 32.5 dyne/cm. at 25° C. At the same time, measurement of sedimentation volume of the polyethylene in the water-methanol solutions revealed that the volume becomes maximum at the proximity of 54% by weight in methanol concentration, as shown in FIG. 1. This means that the polyethylene powder is not easily settled and maintains stable slurry state at the methanol concentration of 54% by weight or its proximity. The solubility of ethylene increases as the concentration of methanol does, as shown in FIG. 2, but 100 g. of the 54% aqueous solution of methanol dissolves only 4 g. of ethylene at 400 kg./cm.$^2$.

It was concluded that a water-methanol solution the methanol concentration of which is 54% by weight (surface tension is 32.5 dyne/cm. at 25° C.) or somewhat greater (surface tension is somewhat lower than 32.5 dyne/cm.) is suitable as a carrier or dispersion medium for discharging produced powder polyethylene out of the reactor system.

When the slurry of powder polyethylene and said 54% aqueous solution of methanol is let stand, the powder sinks to form a thick slurry leaving supernatant liquid, since said medium is lighter than the powder polyethylene. But if the medium is heavier than the powder a thick slurry will be formed near the surface of the liquid.

Experiment 2

Dispersibility of the powder polyethylene produced by radiation polymerization exemplified in Table 1 in aqueous solutions of t-butanol was checked by mixing 0.1 g. of said powder polyethylene in 10 cc. of t-butanol solutions of various concentrations. Solubility of ethylene in these solutions was also checked.

Dispersibility of the powder polyethylene in a solution the butanol concentration of which is 9% by weight (surface tension of which is 32.5 dyne/cm. at 25° C.) or more was very good, but its dispersibility was very poor in a solution wherein the butanol concentration was less than 9% by weight.

At the same time, measurement of sedimentation volume (in reality, floatage volume in this case) of the powder polyethylene in the water-butanol solutions revealed that the volume becomes maximum at the proximity of 9% by weight in t-butanol concentration. This means that the powder polyethylene is not easily settled and maintains a stable slurry state when the butanol concentration is about 9%.

Figure 3:
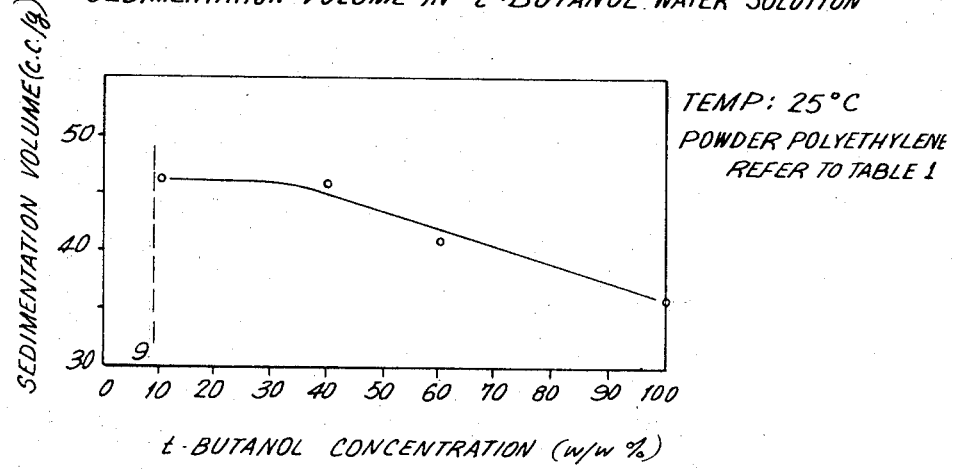
FIG. 3 shows the same relation as in FIG. 1 with respect to t-butanol-water composition.
Figure 4:
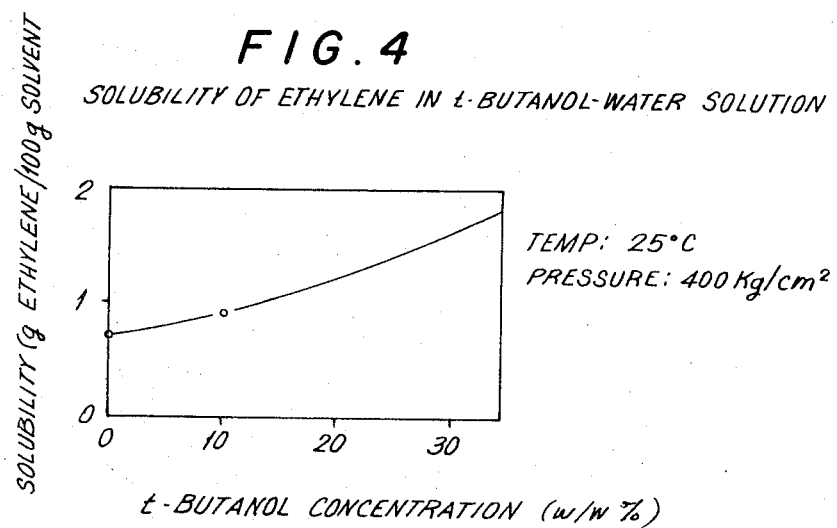
FIG. 4 shows the same relation as in FIG. 2 with respect to t-butanol-water composition.

The solubility of ethylene increases as the concentration of t-butanol does, as shown in FIG. 4, but 100 g. of the 9% by weight aqueous solution of t-butanol dissolves only 0.9 g. of ethylene at a pressure of 400 kg./cm.$^2$.

It was concluded that a water-t-butanol solution the t-butanol concentration of which is 9% by weight (surface tension of which is 32.5 dyne/cm. at 25° C.) or somewhat greater (surface tension is somewhat smaller than 32.5 dyne/cm.) is suitable as a carrier or dispersion medium for discharging produced polyethylene powder out of the reactor system.

In the 9% aqueous solution of butanol, the polyethylene powder floats on standing.

Experiment 3

Dispersibility of the powder polyethylene produced by radiation polymerization exemplified in Table 1 in aqueous solutions of iso-propanol was checked by mixing 0.1 g. of said powder in 10 cc. of iso-propanol solution of various concentrations. Solubility of ethylene in these solutions was also checked.

Dispersibility of the powder polyethylene in a solution the iso-propanol concentration of which was 14% by weight (surface tension of which is 32.5 dyne/cm. at 25° C.) or more was very good, but its dispersibility was very bad in a solution the isopropanol concentration of which was less than 14% by weight.

At the same time, measurement of sedimentation volume (in reality, floatage volume) of the powder polyethylene in the water-iso-propanol solutions revealed that the volume becomes maximum at the proximity of 14% by weight in iso-propanol concentration. This means that the powder polyethylene is not easily settled and maintains a stable slurry state when the iso-propanol concentration is about 14%. In the 14% aqueous solution of propanol, the polyethylene powder floats on standing.

Figure 6:
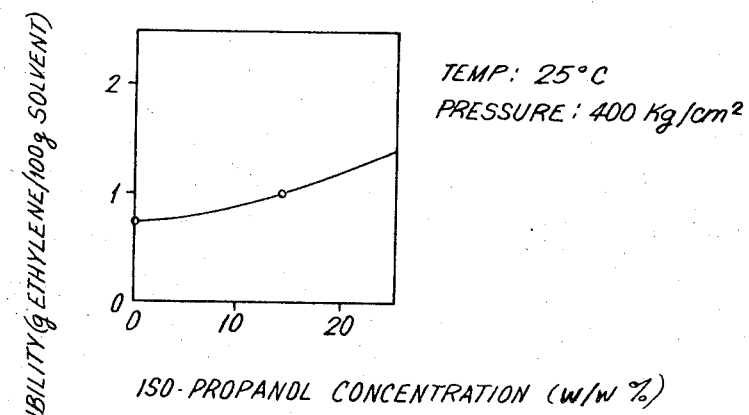
FIG. 6 shows the same relation as in FIG. 2 with respect to iso-propanol-water composition.

The solubility of ethylene increases as the concentration of iso-propanol does, as shown in FIG. 6, but 100 g. of the 14% by weight aqueous solution of iso-propanol dissolves only 1 g. of ethylene at the pressure of 400 kg./cm.$^2$.

It was concluded that a water-iso-propanol solution the iso-propanol concentration of which is 14% by weight or somewhat greater (surface tension of which is 32.5 dyne/cm. or somewhat smaller at 25° C.) is suitable as a carrier or dispersion medium for discharging produced powder polyethylene out of the reactor system.

The same experiment was carried out with respect to ethanol, n-propanol, n-butanol, iso-butanol and sec-butanol, and it was proved that an aqueous solution of these alkanols can be used as the carrier or dispersion medium for the powder polyethylene. The critical values of alkanol concentration and surface tension for dispersing powder polyethylene are shown in Table 2 together with the results of the above three experiments.

TABLE 2

| Alcohol | Critical alkanol concentration and surface tension for dispersing polyethylene powder | |
|---|---|---|
| | Concentration (w./w. percent) | Surface tension (dyne/cm.) |
| Methanol | 54 | 32.5 |
| Ethanol | 32 | 32.5 |
| n-Propanol | 11.5 | 32.5 |
| iso-Propanol | 14 | 32.5 |
| n-Butanol | 5 | 32.5 |
| iso-Butanol | 4 | 32.5 |
| sec-Butanol | 6 | 32.5 |
| t-Butanol | 9 | 32.5 |

EXAMPLE I

Figure 7:
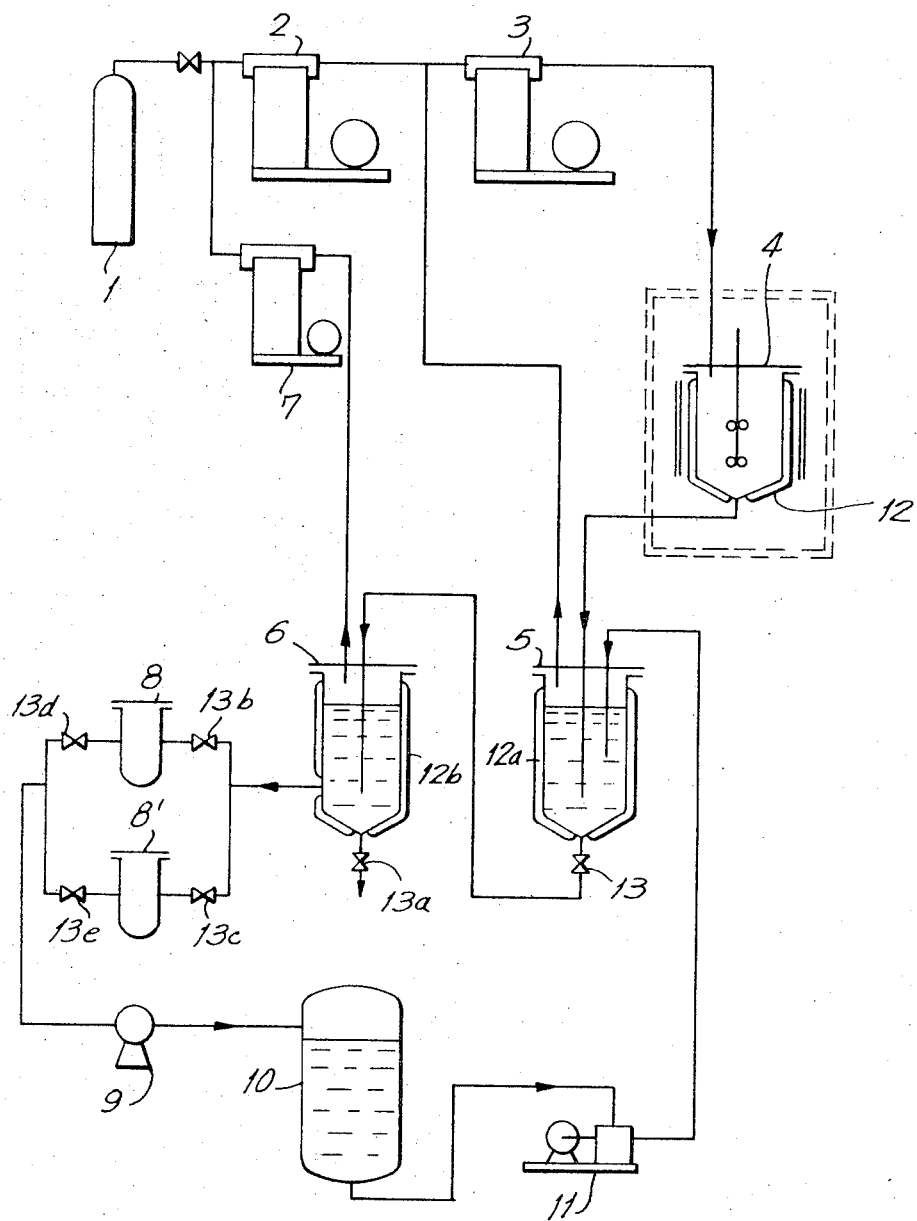
FIG. 7 shows an example of an apparatus for the radiation polymerization of ethylene in which the composition in accordance with this invention is used.

FIG. 7 shows an apparatus for the process of this invention. In this drawing, 1 is ethylene source, usually a cylinder; 2 is a commercially available compressor of two stage diaphragm type, delivering ethylene at the rate of 36 kg./hr., up to the pressure of 400 kg./cm.$^2$; when the suction side is pressured at 20 kg./cm.$^2$; when the suction side is pressurized at 20 kg./cm.$^2$; 3 is another compressor of one stage diaphragm type for circulating ethylene, and is capable of circulating ethylene at the rate of 35 kg./hr. at the pressure of 400 kg./cm.$^2$; 4 is a 10 liter pressure-resistant reaction vessel (reactor) or autoclave equipped with an agitator, placed in a radiation-shield booth; 5 is a 50 liter pressure-resistant product-separating tank (separator); 6 is a settling tank; 7 is a third compressor of one stage diaphragm type, which is able to boost the pressure of ethylene recovered from tank 6 up to 20 kg./cm.$^2$; 8 and 8' are filtering apparatuses, the filter of which comprises nylon cloth with 5 micron meshes (these two filtering apparatuses are used alternately, one of them being used while the other is being cleaned); 9 is a liquid pump of the Wesco type, which serves for transporting the filtered carrier or dispersion medium to vessel 10; 10 is a 200 liter reservoir for the carrier or dispersion medium; 11 is a plunger pump, which is able to feed the carrier to separating tank 5 at the rate of 100 l./hr. or less at the pressure of 400 kg./cm.$^2$ or more; 12, 12a and 12b are water jackets for reactor 4, tanks 5 and 6 respectively, which serve for keeping the content of the reactor or the tanks at a predetermined temperature; 13, 13a, 13b, 13c, 13d and 13e are valves.

All the pipe lines or conduits, except for the ones connecting 4 and 5 are made of stainless steel (18–8 type) pipe 5 mm. in thickness and 10 mm. in inner diameter. The conduit connecting 4 and 5 is a stainless pipe 30 mm. in diameter, and is bent without sharp angles or curves so that there will be no place for polyethylene powder to accumulate. As this is an experimental apparatus, the reaction zone and the product-separating zone are provided in the two separate vessels, namely, the reaction vessel (reactor) and the separating tank (separator) for the sake of ease in the operation. However, these two zones can be combined in one vessel; that is to say, in the apparatus of FIG. 7, if the radiation source is placed so as to irradiate the head space of separating tank 5, this tank will constitute a reaction-and-separating zone.

As stated hereinbefore, the reaction zone may be a pipe reactor, that is, a long pipe coiled in spiral or bent in zigzag and placed in an irradiated zone. When an ionizing radiation is employed as the reaction promotor, cobalt-60 or cesium-137 as a gamma emitter will be conveniently available. If a radical initiator is used as the reaction promotor, the reaction vessel must be equipped with a feeder therefor such as an automatic injection syringe.

Powder polyethylene was produced, the apparatus of FIG. 7 being employed and the carrier or dispersion medium of Experiment 1, that is, a 54% aqueous solution of methanol, being used.

Cobalt-60 of 108 kilo-curies was placed around reactor 4. Ethylene pressurized at 400 kg./cm.$^2$ was circulated between reactor 4 and separating tank 5, fresh ethylene being supplied into the reactor system as ethylene was consumed. While the ethylene was circulating, the powder polyethylene produced was transferred to the carrier by bubbling the reaction mixture into said carrier in the separator and was dispersed therein as a thin slurry. The carrier was introduced into tank 5 from reservoir 10 by means of pump 11 and was kept at a predetermined temperature by passing water of suitable temperature through jackets 12 and 12'. The unreacted ethylene recirculated to the reactor contains up to 1000 p.p.m. of vapor of methanol, but this has no bad effect upon the polymerization.

The thin slurry was transported to settling tank 6 by opening valve 13. The slurry was carried by the pressure of ethylene in the reactor system, since the inside of the settling tank is kept at atmospheric pressure or thereabout. The separator is replenished with the medium supplied from the reservoir.

In the settling tank, powder polyethylene settled to form a thick slurry. When a substantial amount of said thick slurry had accumulated, it was discharged from the bottom of the tank, dried, and the powder was collected as the product.

The medium was separately discharged from the tank and filtered by filtering means 8 or 8'. The filtered medium was kept in reservoir 10. Conditions of irradiation were the same as summarised in Table 1. After 34 hours continuous operation, 2640 g. of the powder polyethylene was obtained, and the produced polyethylene turned out to have almost the same physical properties as the sample of Table 1. Any deleterious effect of methanol in the medium upon the finished powder polyethylene was not observed.

EXAMPLE 2

With respect to the water-t-butanol solution as described in Experiment 2, the same operation as in Example 1 was repeated, the same apparatus being used, except that thick slurry formed in the settling tank is discharged from the upper part thereof, since said slurry is lighter than the medium itself. The t-butanol concentration of the solution was 9% by weight, and its surface tension was 32.5 dyne/cm.

Ethylene was polymerized in the gaseous phase under the same reaction conditions as described in Table 1. The above-mentioned solution was used as the carrier or dispersion medium for discharging the polymerized product. The reaction was continued for 34 hours, and 2760 g. of powder polyethylene was obtained. The properties of the produced powder polyethylene and the rate of polymerization reaction were not different from those of Table 1, and it was recognized that this carrier or dispersion medium has, too, no deleterious effect upon the polymerization of ethylene.

EXAMPLE 3

The operation and apparatus of Example 1 was applied to the (water-iso-propanol solution) described in Experiment 2. The iso-propanol concentration of said solution was 14% by weight, and its surface tension was 32.5 dyne/cm.

In this operation, ethylene was polymerized in the gaseous phase by means of radiation under the same conditions as described in Table 1. The above-mentioned carrier or dispersion medium was used, and the reaction was continued for 34 hours.

The collected powder polyethylene weighed 2600 g. The properties of the thus produced powder polyethylene and the rate of polymerization reaction were not different from those described in Table 1, and it was recognized that this medium has, too, no deleterious effect upon the polymerization of ethylene.

Without using one of the carrier or dispersion mediums, continuous discharge of the produced polyethylene powder from the reactor system to the recovery zone is impossible, that is, the operation of polymerization must be stopped at suitable intervals in order to take out the polyethylene powder accumulated in said separator. The medium in accordance with this invention makes possible the continuous operation of the gaseous phase polymerization of ethylene by which the powder polyethylene is produced.

EXAMPLE 4

Figure 8:
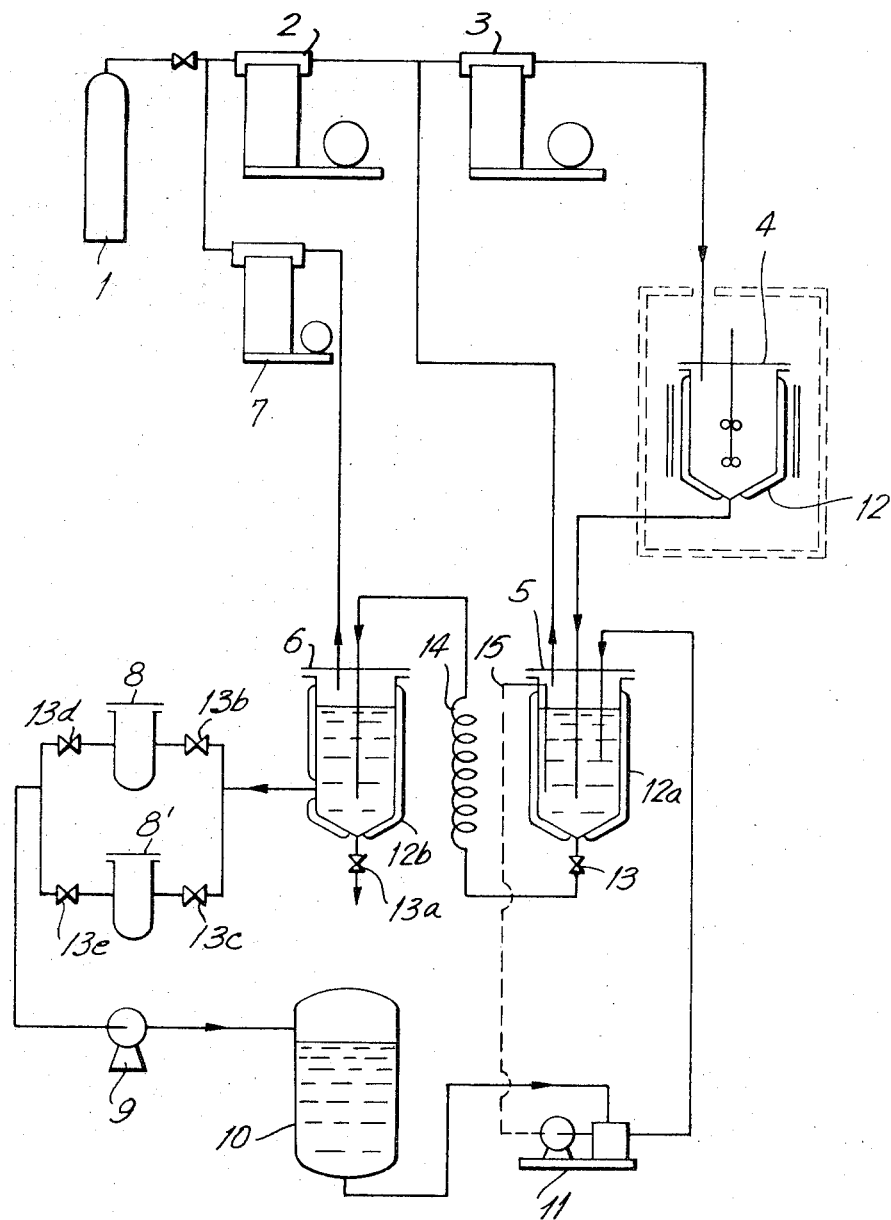
FIG. 8 shows an improved apparatus for the same purpose.

FIG. 8 shows an improved apparatus for the process of this invention. In FIG. 8, members 1–13 are the same as in FIG. 7, and 14 is a coiled pipe, 15 is a level indicator. This apparatus is substantially the same as the apparatus of FIG. 7, except that a coiled pipe 14 as the pressure reducer is inserted in the conduit connecting separating tank 5 and settling tank 6, and circulation of the carrier is automated by detecting the fluctuation of the liquid head in tank 5 and feeding the detected information back to pump 11 so that it may work and stop in accordance with said information.

The pressure reducer 14 is a tubing 2 mm. in inside diameter, 4 mm. in outside diameter and 100 m. in length, coiled in spiral. The liquid head detecting means is a level indicator 15 using capacitor meter. In accordance with the signal from said level indicator, an electromagnetic switch attached to pump 11 operates so that the liquid head in tank 5 may be maintained constant.

Ethylene was polymerized, this apparatus and the carrier of Experiment 2 being used. The conditions of the polymerization reaction were the same as in Example 1. The slurry containing up to 5% by weight of the powder polyethylene passes through said coiled tubing without any trouble.

After 48 hours continuous operation, 3950 g. of powder polyethylene was obtained, the properties of which were not substantially different from those summarized in Table 1.

What we claim is:

1. In a process for producing powder polyethylene by polymerizing ethylene in pressurized gaseous phase at a temperature lower than the melting point of the produced polyethylene, an improvement comprising contacting the produced polyethylene powder with a dispersion medium to separate the produced powder polyethylene from unreacted ethylene, said dispersion medium consisting of an aqueous solution of an alkanol having 1-4 carbon atoms, the alkanol concentration of said solution having a value such that the surface tension of said solution is 32.5 dyne/cm. or less.

2. A process as claimed in claim 1 wherein the produced powder polyethylene is separated after contact with the dispersion medium as a thin slurry, the improvement further comprising passing the thin slurry through a pressure reducer and allowing the thus de-pressurized slurry to settle at atmospheric pressure for separation of the powder polyethylene as a thick slurry.

3. A process as claimed in claim 2 comprising carrying out the process continuously by circulating ethylene along a closed circuit in which a part of the circulating ethylene is polymerized and the produced polymer is separated and removed from the circuit, and adding fresh ethylene to the circuit to compensate for that consumed by the polymerization.

4. A process as claimed in claim 1 wherein the alkanol is t-butanol.

5. A process as claimed in claim 1 wherein the ethylene is polymerized by irradiating the ethylene with cobalt-60 or cesium 137.

6. In a process for producing powder polyethylene by polymerizing ethylene in pressurized gaseous phase at a temperature lower than the melting point of the produced polyethylene, an improvement wherein the process is carried out continuously by the steps comprising circulating pressurized gaseous monomeric ethylene through a reactor system composed of a reaction zone and a product-separating zone, circulating a carrier or dispersion medium between said product-separating zone and a product recovery zone, said medium consisting of an aqueous solution of an alkanol having 1-4 carbon atoms, the alkanol concentration of which is adjusted so that the surface tension of said solution is 32.5 dyne/cm. or less, said medium contacting the circulating ethylene in said separating zone so that the produced powder polyethylene can be collected in said medium as a thin slurry, said slurry being carried through a pressure reducer, to said product recovery zone which is kept at atmospheric pressure, allowing the powder polyethylene dispersed in said slurry to settle in said product recovery zone, discharging a thick slurry of the powder polyethylene from said product recovery zone to be dried and recovered, and supplying fresh ethylene continuously to said ethylene circulating in said reactor system to compensate for the amount of ethylene consumed.

References Cited
UNITED STATES PATENTS

| | | | |
|---|---|---|---|
| 2,831,845 | 4/1958 | Biddle et al. | 260—94.9 |
| 3,372,153 | 5/1968 | Turner et al. | 260—92.1 |

JOSEPH L. SCHOFER, Primary Examiner

S. M. LEVIN, Assistant Examiner